Patented Jan. 20, 1948

2,434,797

UNITED STATES PATENT OFFICE 2,434,797

GLYCERYL ETHER OF HYDROGENATED CARDANOL

Mortimer T. Harvey, South Orange, N. J., assignor to The Harvel Corporation, a corporation of New Jersey No Drawing. Application January 30, 1945, Serial No. 575,358

1 Claim. (Cl. 260—613)

This invention relates to novel composition of matter and to methods for preparing the same. More specifically the invention is directed to novel ethers of hydrogenated distillates of cashew nut shell liquid.

The distillates from cashew nut shell liquid may be obtained by distilling cashew nut shell liquid. The preferable manner of obtaining these products is to distill the cashew nut shell liquid at elevated temperatures. In commercial production, the cashew nut shell liquid may be either gas or vapor and for example steam distilled preferably at between 600° F.–700° F. or distilled under sub-atmospheric pressure conditions and preferably below about 50 mm. of mercury pressure and temperatures between about 400° F.–700° F. When distilled under reduced pressure of about 50 mm. of mercury I prefer to employ temperatures between about 525° F. and 700° F. and when distilled under reduced pressure of about 10 mm. of mercury I prefer to employ a temperature of about 450° F. By whatever method employed, the distillation is continued until the quantity by weight of the distillate is between about 25% to 75% of the quantity by weight of the cashew nut shell liquid. The distillates thus obtained for the most part consist of a phenol having an unsaturated hydrocarbon substituent having more than 13 carbon atoms and having a boiling point of approximately 225° C. at 10 mm. of mercury pressure. Of these distillates I prefer to employ those produced by vacuum distillation, thus eliminating the use of steam or the like.

These distillates obtained by whatever of said methods employed consist essentially of a compound having the following general structural formula:

in which $x$ is an unsaturated straight chain hydrocarbon substituent having approximately 15 carbons, with the unsaturation being due solely to one or more ethylenic linkage.

After said distillates are obtained they may be hydrogenated in order to completely saturate the unsaturated straight chain hydrocarbon substituent thereof. One of the methods which may be employed for this hydrogenation is to place a quantity of one of said distillates of cashew nut shell liquid in a vessel which may be composed of glass or the like, then there is added to said distillate a quantity of a catalyst such as comminuted platinum black or the like which is stirred therein. The temperature of this mix may be between about room temperature and approximately 180° C. and while at this temperature hydrogen is bubbled therethrough. This action is continued until the unsaturated hydrocarbon substituent has been completely saturated and now the resultant product consists essentially of a compound having the following structural formula:

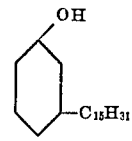

Then this hydrogenated distillate may be reacted with glycerine mono chlor hydrin and glycol chlor hydrin in the presence of an alkali preferably sodium hydroxide. The reaction is preferably carried out with the aid of external heat to provide an ether of said hydrogenated distillate, said ether having the following general formula:

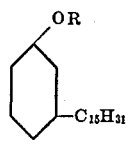

in which R is a radicle selected from the group consisting of

and

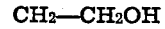

They may be reacted with polybasic acids such as phthallic anhydride, maleic acid and the like to provide novel organic condensation reaction products which would be particularly suitable in those places such as varnishes and the like where high tolerance to petroleum spirits is desired. They may be nitrated or sulphonated. The sulphonated products are excellent wetting agents. They may be admixed with resins such as the phenol-formaldehyde resins, urea-formaldehyde resins. They are mixed with said resins when said resins are in the fusible state and when these mixtures are converted to the infusible state the presence of these novel ethers therein impart improved impact strength thereto. In addition, they may be used as plasticizers for cellulose nitrate, normally solid polyvinyl alcohol and the like. They may be condensed with phenols such as ordinary phenol, anthranol, cresols, xylenols and their homologues in the presence of a katenoid condensing agent in order to provide complex condensation reaction products. They may be reacted with alkyl halides under alkaline conditions for further etherification.

The following Examples 1 and 2 illustrate the manner of obtaining said compounds and are set forth in an illustrative and not in a limiting sense.

Example 1

300 grams of one of said distillates of cashew nut shell liquid hydrogenated in the manner aforedescribed and 45 grams of sodium hydroxide are dissolved in 600 grams of ethyl alcohol. This solution is placed in a glass flask having a reflux condenser extending upwardly therefrom. Through said reflux condenser and into said solution is slowly added 115 grams of glycerine mono chlor hydrin whereupon an exothermic reaction ensues. After the last increment of said glycerine mono chlor hydrin has been added and after the exothermic reaction has substantially subsided, external heat is applied to bring the mass to a state of boiling and to maintain said mass in a boiling condition under said reflux condenser for about 3 hours. Then the resultant mass is neutralized, the salts are separated therefrom and the alcohol solution of the novel ether may be heated to evaporate the alcohol solvent therefrom leaving a substantial mass which is solid at room temperature and is essentially a compound having the following formula:

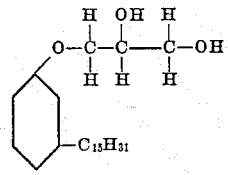

Example 2

300 grams of one of said distillates of cashew nut shell liquid hydrogenated in the manner aforedescribed and 45 grams of sodium hydroxide are dissolved in 600 grams of ethyl alcohol. This solution is placed in a glass flask having a reflux condenser extending upwardly therefrom. Through said reflux condenser and into said solution is slowly added 90 grams of glycol chloro hydrin whereupon an exothermic reaction ensues. After the last increment of said glycol chloro hydrin has been added and after the exothermic reaction has substantially subsided, external heat is applied to bring the mass to a state of boiling and to maintain said mass in a boiling condition under said reflux condenser for about 3 hours. Then the resultant mass is neutralized, the salts are separated therefrom and the alcohol solution of the novel ether may be heated to evaporate the alcohol solvent therefrom leaving a substantially solid mass which is solid at room temperature and is essentially a compound having the following formula:

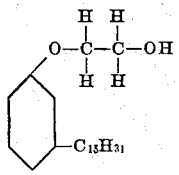

Either of these novel ethers of Examples 1 and 2 may be sulphonated in the following manner:

To 100 grams of either of said ethers in comminuted form is slowly added an amount of concentrated sulphuric acid equal to between about 30%–50% by weight of said ether. Throughout the entire course of this addition the temperature of the mass is maintained below about 50° C. and preferably at about 25° C. After the addition of the last increment of sulphuric acid the mass is maintained at said temperature for a period of ½ to 1 hour. Then the mass is allowed to stand for about 16 hours in an ambient of about 70° F. At the end of that period the mass is neutralized with a weak solution of sodium hydroxide. The resultant mass may be used as it is or some of the sodium salts may be separated therefrom by extracting with alcohol or the solution may be concentrated and then allowed to stand so that the salts crystallize out, settle to the bottom and may be removed by filtration or decantation. The sulphonated product of said novel ethers serve as excellent wetting agents.

Since certain changes in carrying out the above process and certain modifications in the compositions which embody the invention may be made without departing from its scope, it is intended that all matter contained in the above description shall be interpreted as illustrative and not in a limiting sense.

It is also to be understood that the following claim is intended to cover all the generic and specific features of the invention herein described and all statements of the scope of the invention, which as a matter of language might be said to fall therebetween; and that they are intended to be inclusive in scope and not exclusive, in that, if desired, other materials may be added to no novel composition of matter herein claimed without departing from the spirit of the invention. Particularly it is to be understood that in said claim, ingredients or components recited in the singular are intended to include compatible mixtures of said ingredients wherever the sense permits.

Having thus described my invention, what I claim and desire to protect by Letters Patent is:

A novel compound having the following general formula:

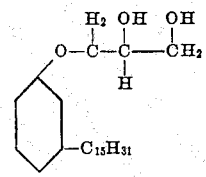

Said hydrocarbon substituent $C_{15}H_{31}$ being straight chain, said compound being a solid at room temperature.

MORTIMER T. HARVEY.

REFERENCES CITED

The following references are of record in the file of this patent:

UNITED STATES PATENTS

| Number | Name | Date |
|---|---|---|
| 2,075,018 | Bruson | Mar. 30, 1937 |
| 2,134,001 | Mills | Oct. 25, 1938 |
| 2,058,456 | Hughes | Oct. 27, 1936 |
| 2,157,126 | Harvey | May 9, 1939 |
| 2,240,034 | Caplan | Apr. 29, 1941 |
| 2,384,323 | McCleary | Sept. 4, 1945 |